United States Patent
Leese et al.

(10) Patent No.: US 8,047,691 B2
(45) Date of Patent: Nov. 1, 2011

(54) INTEGRATED REAR HIGH MOUNTED IDENTIFICATION LAMP AND BED CARGO LAMP

(75) Inventors: Michael V. Leese, Troy, MI (US); Scott Tate, Dearborn, MI (US); Dennis Salciccioli, Commerce, MI (US); Paul Wrona, Howell, MI (US); Kelley Maria Adams-Campos, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 12/336,173

(22) Filed: Dec. 16, 2008

(65) Prior Publication Data
US 2010/0149826 A1   Jun. 17, 2010

(51) Int. Cl.
*B60Q 1/00* (2006.01)
(52) U.S. Cl. ........... 362/496; 362/249.02; 362/485; 362/545
(58) Field of Classification Search .......... 362/249.02, 362/485, 496, 543–546
See application file for complete search history.

(56) References Cited

U.S. PATENT DOCUMENTS

| | | | |
|---|---|---|---|
| 3,831,018 A | | 8/1974 | Weber |
| 4,891,625 A | | 1/1990 | VanRiper et al. |
| 5,839,231 A | * | 11/1998 | Gebhart et al. ........ 49/413 |
| 6,976,774 B2 | | 12/2005 | Reiss |
| 2008/0062708 A1 | | 3/2008 | Kolstee et al. |
| 2008/0130309 A1 | * | 6/2008 | Condon et al. ........ 362/520 |

FOREIGN PATENT DOCUMENTS

CN   201042937 Y   12/2006

OTHER PUBLICATIONS

"2004 Nissan Frontier Crew Cab," http://www.finchermotor.com/2004_nissan_frontier_2wd_2287.php; 3 pgs.; printed Sep. 17, 2008.
"LED Identification Lamp Bar," http://www.alibaba.com/product-51152588/LED_Identification_Lamp_Bar.html; 2 pgs., printed Sep. 16, 2008.

* cited by examiner

*Primary Examiner* — Stephen F Husar
*Assistant Examiner* — Meghan K Dunwiddie
(74) *Attorney, Agent, or Firm* — Gregory P. Brown; Price Heneveld LLP

(57) ABSTRACT

A cargo lamp assembly includes a lamp housing with first and second ends having first and second adjacent cavities. A first incandescent light source is disposed in the first cavity and a second incandescent light source is disposed in the second cavity. A first outboard light-emitting diode is disposed proximate the first end of the lamp housing and a second outboard light-emitting diode is disposed proximate the second end of the lamp housing. An intermediate identification light source is disposed between the first and second cavities of the lamp housing.

19 Claims, 5 Drawing Sheets

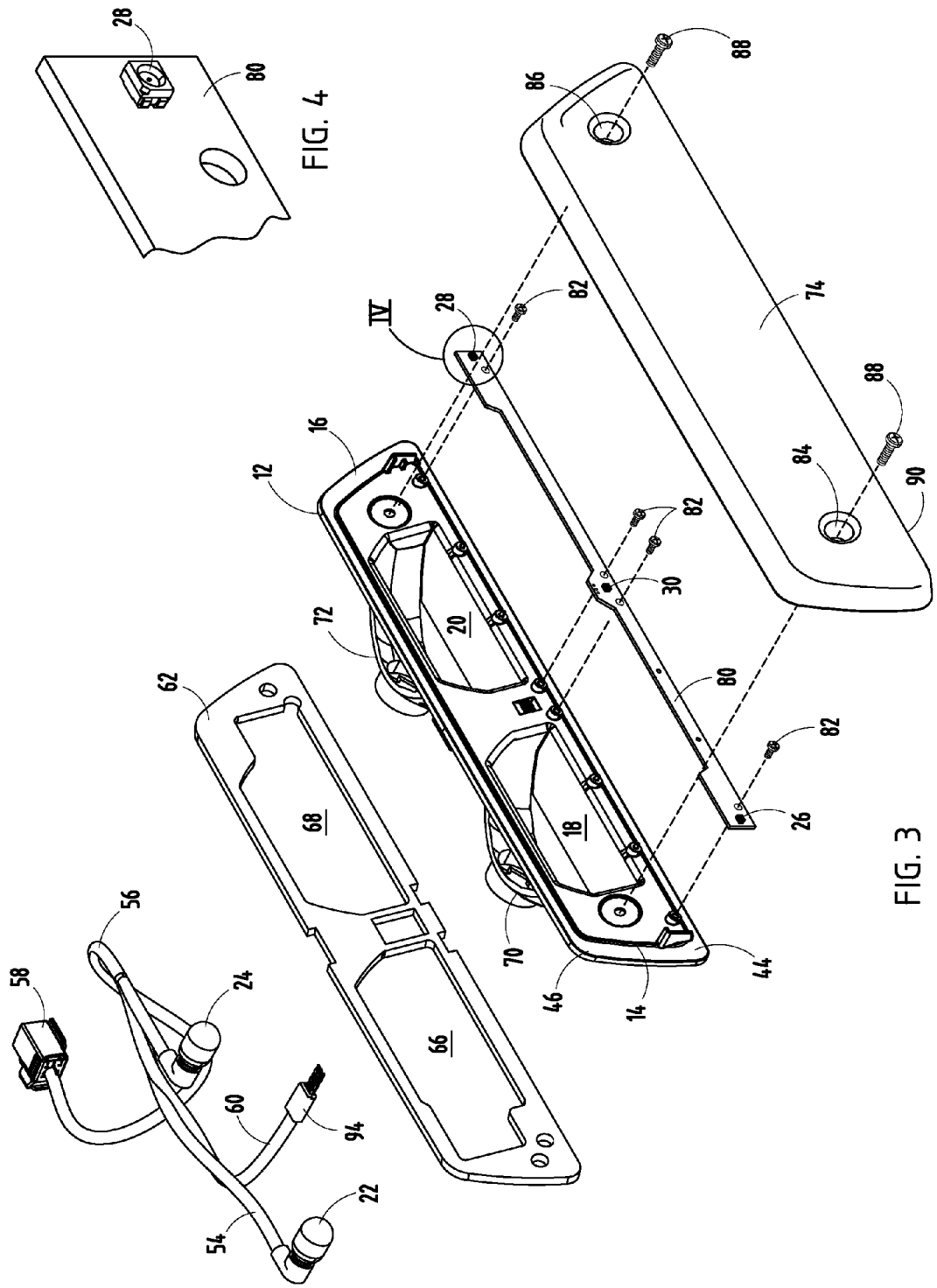

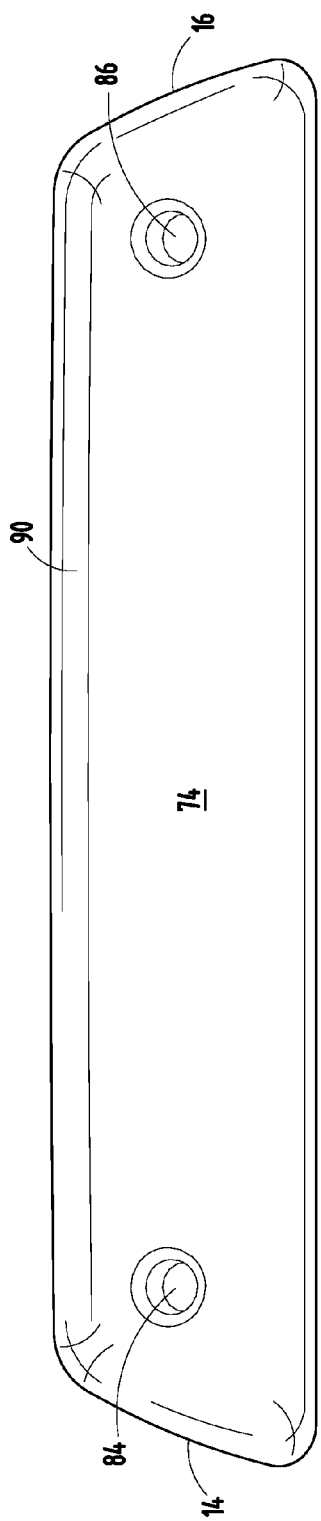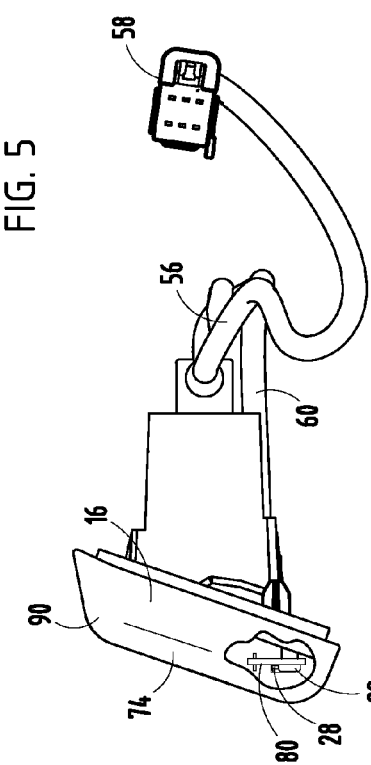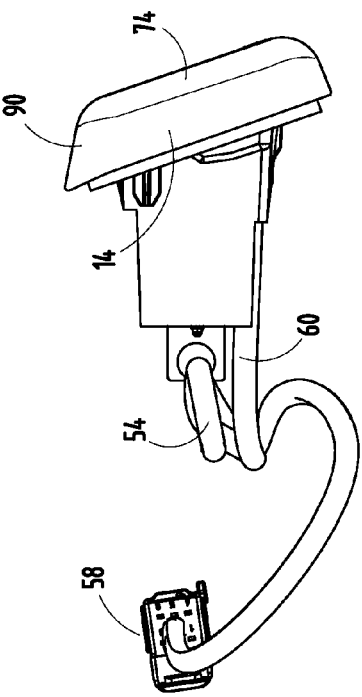

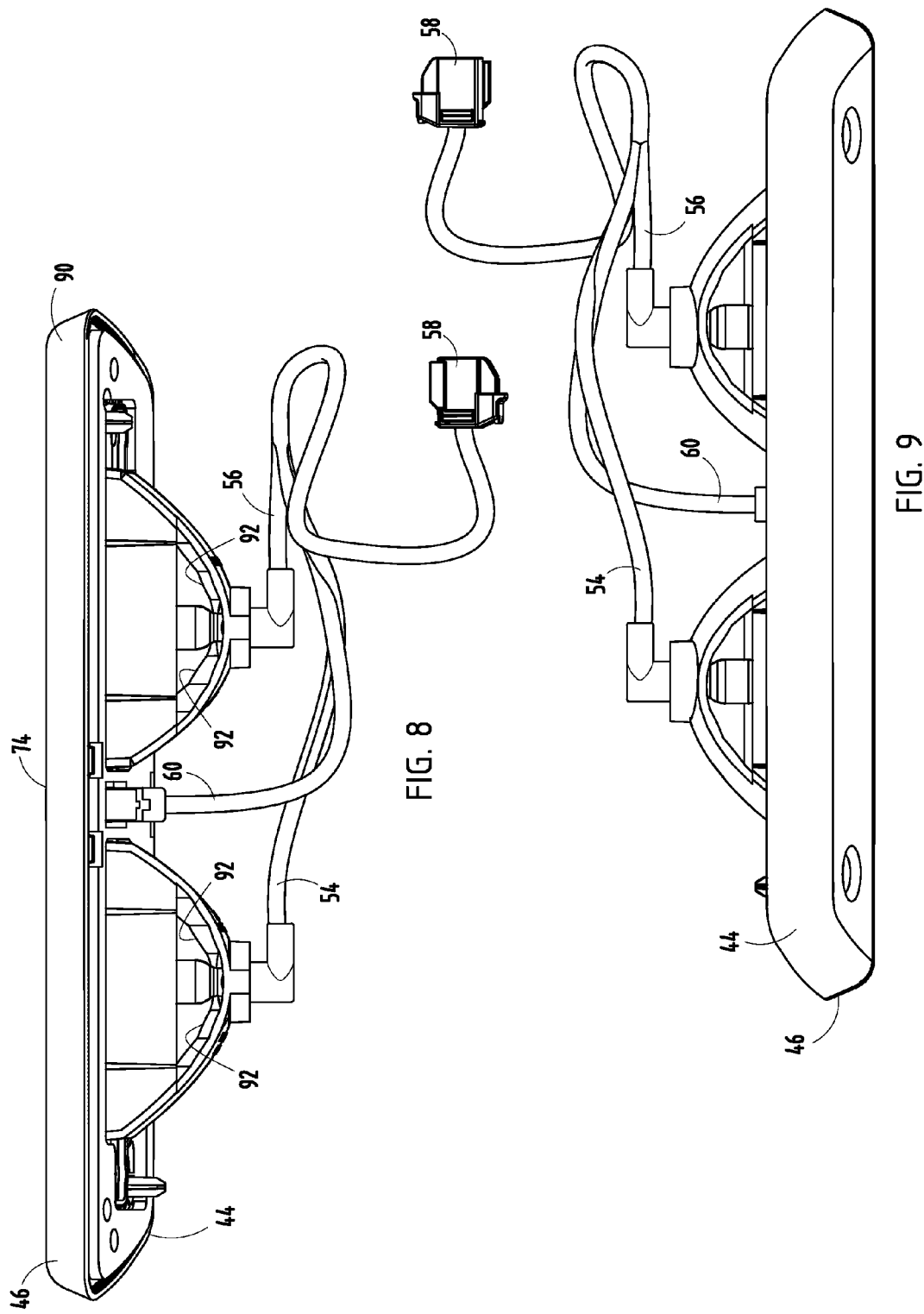

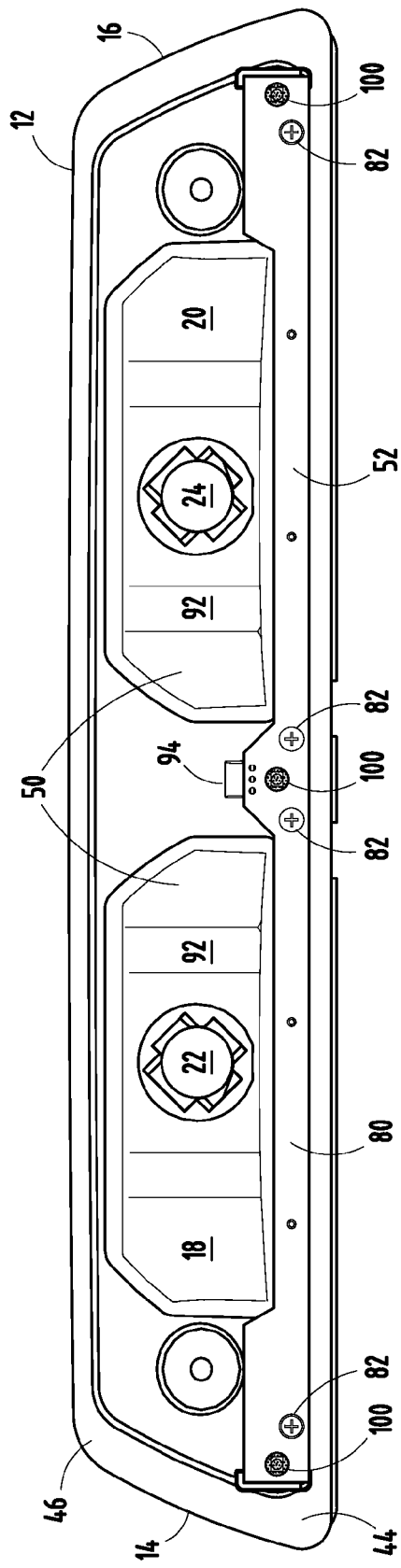
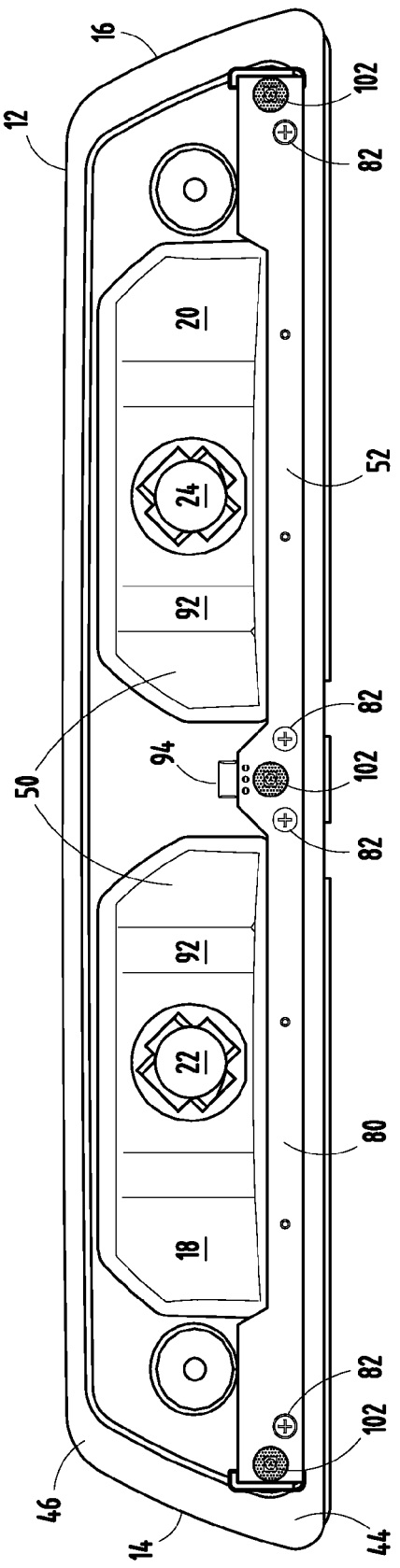
FIG. 10
FIG. 11

US 8,047,691 B2

INTEGRATED REAR HIGH MOUNTED IDENTIFICATION LAMP AND BED CARGO LAMP

FIELD OF THE INVENTION

The present invention concerns vehicles, and more particularly relates to a rear high mounted identification lamp integrated into a bed cargo lamp for a vehicle.

BACKGROUND OF THE INVENTION

Wide vehicles include identification lamps to indicate the vehicle is equal to or over 80 inches wide.

SUMMARY OF THE PRESENT INVENTION

In one aspect of the present invention, a cargo lamp assembly includes a lamp housing with first and second ends having first and second adjacent cavities. A first incandescent light source is disposed in the first cavity and a second incandescent light source is disposed in the second cavity. A first outboard light-emitting diode is disposed proximate the first end of the lamp housing and a second outboard light-emitting diode is disposed proximate the second end of the lamp housing. An intermediate light-emitting diode is disposed between the first and second outboard light emitting diodes.

In another aspect of the present invention, a cargo lamp assembly for a vehicle includes a lamp housing disposed on a rear portion of a cab of the vehicle having first and second bed lamp light sources disposed therein, the first and second light sources directing light at a downward angle. A first identification light source is disposed proximate the first end of the lamp housing and a second identification light source is disposed proximate the second end of the lamp housing. An intermediate identification light source is disposed between the first and second cavities of the lamp housing.

In still another aspect of the present invention, an integrated rear high mounted identification lamp and bed cargo lamp for a vehicle includes a bed cargo lamp having an elongate body with first and second reflective cavities. First and second bed light sources are disposed in the first and second reflective cavities, respectively. An identification lamp is connected with the bed cargo lamp and has a plurality of identification light sources operable between a first light intensity output level and a second light intensity output level, wherein the first light intensity output is lower than the second light intensity output and the identification light source is operably connected with an external lighting system and a braking system.

These and other aspects, objects, and features of the present invention will be understood and appreciated by those skilled in the art upon studying the following specification, claims, and appended drawings.

BRIEF DESCRIPTION OF DRAWINGS

FIG. 3 is a top perspective exploded view of the integrated lamp assembly of FIG. 2;

FIG. 4 is an enlarged top perspective view of area IV of FIG. 3;

FIG. 5 is a front elevational view of one embodiment of the integrated lamp assembly of the present invention;

FIG. 6 is a right side elevational view of the integrated lamp assembly of FIG. 3;

FIG. 7 is a left side elevational view of the integrated lamp assembly of FIG. 3;

FIG. 8 is a bottom elevational view of the integrated lamp assembly of FIG. 3;

FIG. 9 is a top elevational view of the integrated lamp assembly of FIG. 3;

FIG. 10 is a front elevational view of the integrated lamp assembly with the identification strip at low intensity; and FIG. 11 is a rear elevational view of the integrated lamp assembly with the identification strip at high intensity.

DETAILED DESCRIPTION

Figure 2:
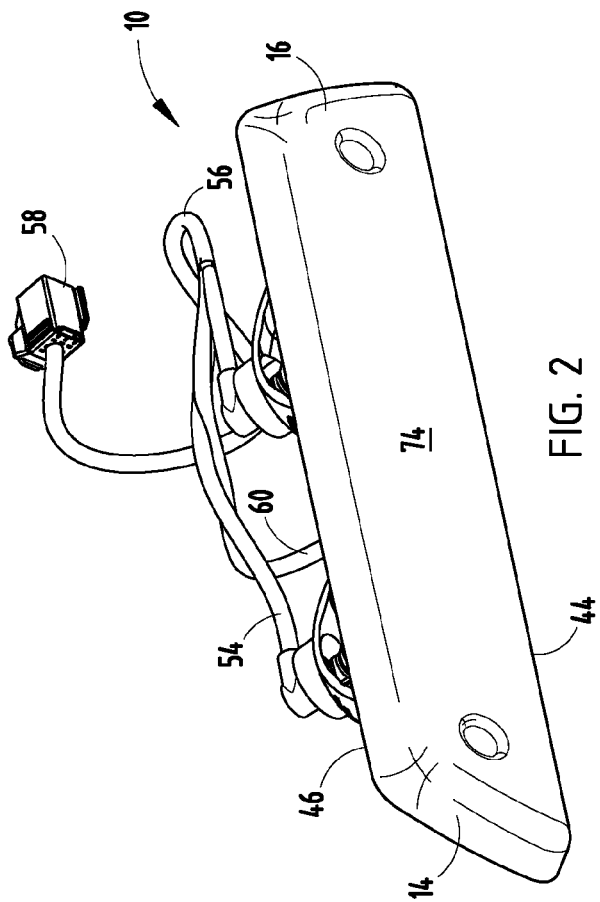
FIG. 2 is an enlarged view of the integrated lamp assembly of FIG. 1 removed from the vehicle.

For purposes of description herein, the terms "upper," "lower," "right," "left," "rear," "front," "vertical," "horizontal," and derivatives thereof shall relate to the invention as orientated in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
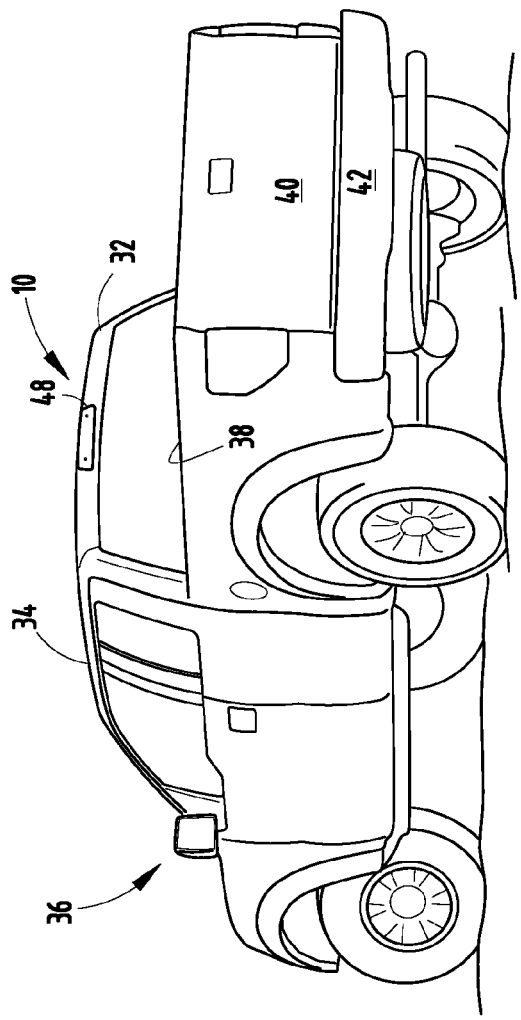
FIG. 1 is a side perspective view of a vehicle incorporating one embodiment of an integrated lamp assembly of the present invention.

The reference number 10, shown generally in FIGS. 1-3, designates a cargo lamp assembly having a lamp housing 12 with first and second ends 14, 16 having first and second adjacent cavities 18, 20. A first bed light source 22 is disposed in the first cavity 18 and a second bed light source 24 is disposed in the second cavity 20. A first identification light source 26 is disposed proximate the first end 14 of the lamp housing 12 and a second identification light source 28 is disposed proximate the second end 16 of the lamp housing 12. An intermediate identification light source 30 is disposed between the first and second cavities 18, 20 of the lamp housing 12.

Referring to FIG. 1, the first and second bed light sources 22 and 24 are generally shown as incandescent light sources. However, it is contemplated that the first bed light source 22 and the second bed light source 24 may be incandescent lights, light-emitting diodes, light pipes, etc. Similarly, the first identification light source 26 is shown as a first outboard light-emitting diode, the second identification light source 28 is shown as a second outboard light-emitting diode, and the intermediate identification light source 30 is shown as an intermediate light-emitting diode. However, the identification light sources 26, 28, and 30 could be incandescent lights, light-emitting diodes, light pipes, etc.

Referring again to FIGS. 1 and 2, the cargo lamp assembly 10 is generally disposed on a top rear portion 32 of a cab 34 of a vehicle 36. However, it is contemplated that the cargo lamp assembly 10 could be placed in the bed 38 of a vehicle 36, on the tailgate 40, or above the bumper 42, among other positions on the vehicle 36. In one embodiment, the cargo lamp assembly 10 is approximately 12 inches wide, however, it is contemplated that the cargo lamp assembly 10 could be larger or smaller than 12 inches wide. Additionally, it is contemplated that the cargo lamp assembly 10, regardless of location on the vehicle 36, will be centrally positioned on the vehicle 36 in a rear view or on the vehicle's longitudinal centerline. In one embodiment, the distance between the first identification light source 26 and the second identification light source 28 will generally range from approximately twelve inches (six inches from the center of the first identification light source 26 to the center of the intermediate identification light source 30 and six inches from the center of the intermediate identification light source 30 to the center of the second identification light source 28) to twenty-four inches (twelve inches from the center of the first identification light source 26 to the center of the intermediate identification light source 30 and twelve inches from the center of the intermediate identification light source 30 to the center of the second identification light source 28). In addition, the intermediate identification light source 30 is generally disposed centrally between the first identification light source 26 and the second identification light source 28, although it is contemplated that the intermediate identification light source 30 could be positioned at any location between the first identification light source 26 and the second identification light source 28.

Referring to FIG. 2, a lower portion 44 of the cargo lamp assembly 10 is wider than an upper portion 46 and the cargo lamp assembly 10 and is designed to be inserted into a bed cargo lamp receiving aperture 48. The cargo lamp assembly 10 includes a bed cargo lamp 50 (FIGS. 10 and 11) integrated with an identification lamp 52 (FIGS. 10 and 11) that identifies the vehicle 36 as being a wide vehicle 36, for example, a vehicle being equal to or over 80 inches wide. Accordingly, the integrated rear high mounted identification lamp 52 and bed cargo lamp 50 can be inserted into the same bed cargo lamp receiving aperture 48 that was designed for the bed cargo lamp 50 alone.

Referring now to FIGS. 3 and 4, the cargo lamp assembly 10 includes first and second power lines 54, 56 that merge into a single power connector 58. The first and second power lines 54, 56 connect with the first and second adjacent cavities 18, 20 and provide power to the first and second bed light sources 22, 24, respectively. A third power line 60 provides power for the first and second identification light sources 26, 28 and the intermediate identification light source 30. The third power line 60 also connects with the first and second power lines 54, 56 before connecting with the power connector 58. A frame 62 supports a rear portion 64 of the cargo lamp assembly 10 and includes first and second apertures 66, 68 adapted to receive first and second cavities 18, 20 of the lamp housing 12. The first and second bed light sources 22, 24 include first and second frame structures 70, 72 that support the power lines 54, 56 and the first and second bed light sources 22, 24, respectively. The cargo lamp assembly 10 also includes a lens or translucent lens or translucent cover 74 that allows substantial light dispersion when the bed light sources 22, 24 or identification light sources 26, 28, 30 are activated. It is contemplated that the lens or translucent lens or translucent cover 74 may be colored or clear.

Referring again to FIG. 3, the lower portion 44 of the identification lamp 52 (FIGS. 10 and 11) of the lamp assembly 10 includes an identification strip 80 upon which the first and second identification light sources 26, 28 as well as the intermediate identification light source 30 are connected. The identification strip 80 is secured by a plurality of mechanical fasteners 82 that engage fastener apertures on the lamp housing 12. In addition, the lens or translucent cover 74 includes first and second mechanical fastener apertures 84, 86 that align with mechanical fastener apertures on the lamp housing 12 such that the lens or translucent cover 74 is held in place when mechanical fasteners 88 are secured through the lens or translucent cover 74 and into the lamp housing 12. The identification strip 80 is disposed inside the lens or translucent cover 74 such that the identification strip 80 is protected by the lens or translucent cover 74 from the elements after installation into a vehicle 36.

Referring now to FIGS. 5-7, the lens or translucent cover 74 of the cargo lamp assembly 10 is angled slightly upwardly and includes a rounded periphery 90. The identification strip 80 is disposed perpendicular with the base of the cargo lamp assembly 10. It is contemplated that different numbers of light-emitting diodes can be used and the identification strip 80 can be set at various angles. Further, it is contemplated that multiple light sources may be present at each of the first identification light source, second identification light source and intermediate identification light source locations. In one embodiment, multiple light-emitting diodes are located in each of the positions of the first identification light source 26, second identification light source 28 and intermediate identification light source 30 to provide one wholly continuous or ruminated area in each of the three positions. In addition, it is contemplated that the identification strip 80 may be located above the bed light sources 22, 24 rather than below the bed light sources 22, 24.

As shown in FIGS. 8 and 9, the first and second cavities 18, 20 of the cargo lamp assembly 10 include reflective concave surfaces 92 adapted to reflect light outward into the bed 38 of the vehicle 36. A power connector 94 (FIG. 3) extends into the rear of the lamp housing 12 and provides power to the identification strip 80 and the lower end of the cargo lamp assembly 10.

Referring now to FIGS. 10 and 11, the identification strip 80 of the identification lamp 52 is adapted to operate at a low intensity light output state 100 when an external vehicle light system is engaged. However, during application of brakes on the vehicle 36, the light intensity of the identification light sources 26, 28, 30 in the identification strip 80 increases to a higher intensity light output state 102. Accordingly, visibility of the vehicle 36 from the rear of the vehicle 36 during braking is increased. In one embodiment, the light intensity increases from 10-12 candela to 100-120 candela. However, it is contemplated that low intensity light output state may range from 0.25 candela to 15 candela.

It is contemplated that the identification strip 80 may not be connected with the braking system of the vehicle 36 such that the light intensity remains the same even during braking. In addition, the bed light sources 22, 24 are designed to operate with an internal vehicle lighting system engaged such that cargo in the bed 38 of the vehicle 36 can be readily located when ambient light is poor. Generally, the cargo lamp assembly 10 may be installed in vehicles 36 having a width equal to or over 80 inches to notify other vehicle operators that the vehicle 36 is equal to or over 80 inches wide. Accordingly, the first and second identification light sources 26, 28 and the intermediate identification light source 30 function as both an identification lamp indicating that the vehicle is wide and as supplemental braking lamps for additional safety.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A cargo lamp assembly, comprising:
 a lamp housing with first and second ends having first and second adjacent cavities;
 a first incandescent light source disposed in the first cavity;
 a second incandescent light source disposed in the second cavity;

a first outboard light-emitting diode disposed proximate the first end of the lamp housing;

a second outboard light-emitting diode proximate the second end of the lamp housing; and an intermediate light-emitting diode disposed between the first and second cavities of the lamp housing.

2. The cargo lamp assembly of claim 1, wherein the first and second outboard light-emitting diodes and the intermediate light-emitting diode are operably connected to an external lighting system on a vehicle.

3. The cargo lamp assembly of claim 2, wherein the first and second outboard light-emitting diodes and the intermediate light-emitting diode are operably connected to a braking system in a vehicle such that the first and second outboard light-emitting diodes and the intermediate light-emitting diode emit at least 100 candela when the brakes are engaged.

4. The cargo lamp assembly of claim 3, wherein the first and second outboard light-emitting diodes and the intermediate light-emitting diode are operably connected to an external light system.

5. The cargo lamp assembly of claim 4, wherein the first and second outboard light-emitting diodes and the intermediate light-emitting diode are disposed on a lower portion of the lamp housing.

6. The cargo lamp assembly of claim 5, wherein the cargo lamp assembly is disposed on a vehicle equal to or over 203.2 centimeters (80 inches) wide and the intermediate light-emitting diode is disposed centrally between the first outboard light-emitting diode and the second outboard light-emitting diode.

7. The cargo lamp assembly of claim 6, wherein the vehicle includes a cab and the cargo lamp assembly is disposed centrally on a rear portion of the cab.

8. A cargo lamp assembly for a vehicle, comprising:

a lamp housing disposed on the vehicle an identification strip positioned in the lamp housing, wherein an identification light source is positioned proximate first and second ends of the identification strip, as well as an intermediate portion of the identification strip; and first and second bed lamp light sources disposed in the lamp housing proximate but distinct and separate from each identification light source and identification strip.

9. The cargo lamp assembly of claim 8, wherein identification light source is operably connected to an external lighting system on the vehicle.

10. The cargo lamp assembly of claim 9, wherein each identification light source is operably connected to a braking system in the vehicle such that the identification light sources emit at least 100 candela when the brakes are engaged.

11. The cargo lamp assembly of claim 10, wherein the identification light sources are operably connected to an external light system.

12. The cargo lamp assembly of claim 11, wherein the first and second bed lamp light sources are operably connected to an internal light system.

13. The cargo lamp assembly of claim 8, wherein the cargo lamp assembly is disposed on a rear portion of a cab of the vehicle.

14. The cargo lamp assembly of claim 13, wherein the identification light sources are light-emitting diodes.

15. An integrated rear high mounted identification lamp and bed cargo lamp for a vehicle, comprising:

a bed cargo lamp having:

an elongate body with first and second reflective cavities;

first and second light sources disposed in the first and second reflective cavities, respectively; and an identification lamp connected with the bed cargo lamp including:

a plurality of identification light sources operable between a first light intensity output level and a second light intensity output level, wherein the first light intensity output is lower than the second light intensity output and the identification light sources are operably connected with an external lighting system and a braking system.

16. The cargo lamp assembly of claim 15, wherein the plurality of identification light sources operate at the high intensity light output level when the braking system is engaged and operate at the low intensity light output level when the external lighting system is engaged.

17. The cargo lamp assembly of claim 16, wherein the plurality of identification light sources are disposed on a lower portion of the lamp housing.

18. The cargo lamp assembly of claim 17, wherein the cargo lamp assembly is disposed on a vehicle having a truck bed and a cab.

19. The cargo lamp assembly of claim 18, wherein the identification light sources are first and second outboard light-emitting diodes and an intermediate outboard light-emitting diode.

* * * * *